(12) United States Patent
Malzacher

(10) Patent No.: US 12,517,199 B2
(45) Date of Patent: Jan. 6, 2026

(54) MULTICHANNEL RADIO FREQUENCY ARRAY FOR TRACKING A MEDICAL INSTRUMENT

(71) Applicant: Siemens Healthcare GmbH, Erlangen (DE)

(72) Inventor: Matthias Malzacher, Nuremberg (DE)

(73) Assignee: Siemens Healthineers AG, Forchheim (DE)

( * ) Notice: Subject to any disclaimer, the term of this patent is extended or adjusted under 35 U.S.C. 154(b) by 117 days.

(21) Appl. No.: 18/207,474

(22) Filed: Jun. 8, 2023

(65) Prior Publication Data
US 2023/0400540 A1   Dec. 14, 2023

(30) Foreign Application Priority Data

Jun. 8, 2022   (DE) .................. 10 2022 205 796.1

(51) Int. Cl.
| | | |
|---|---|---|
| *G01R 33/34* | (2006.01) | |
| *A61B 5/055* | (2006.01) | |
| *G01R 33/341* | (2006.01) | |

(52) U.S. Cl.
CPC ........ *G01R 33/34084* (2013.01); *A61B 5/055* (2013.01); *G01R 33/341* (2013.01)

(58) Field of Classification Search
CPC .................. A61B 5/055; G01R 33/285; G01R 33/34084; G01R 33/341; G01R 33/3415; G01R 33/3456; G01R 33/3621; G01R 33/365
See application file for complete search history.

(56) References Cited

U.S. PATENT DOCUMENTS

| | | |
|---|---|---|
| 2005/0062472 A1 | 3/2005 | Bottomley |
| 2012/0194192 A1 | 8/2012 | Biber et al. |

FOREIGN PATENT DOCUMENTS

| | | |
|---|---|---|
| DE | 102010033322 A1 | 2/2012 |
| DE | 102021214562 B3 | 4/2023 |
| WO | 03058283 A1 | 7/2003 |

OTHER PUBLICATIONS

Avdievich, Nikolai I., et al. "Bent folded-end dipole head array for ultrahigh-field MRI turns "dielectric resonance" from an enemy to a friend." Magnetic resonance in medicine 84.6 (2020): 3453-3467.

*Primary Examiner* — Michael T Rozanski
(74) *Attorney, Agent, or Firm* — Lempia Summerfield Katz LLC

(57) ABSTRACT

A local coil for percutaneous magnetic resonance tomography (MRT)-assisted minimally invasive intervention. The local coil has a carrier body for flat arrangement on a body surface of a patient, a plurality of antennas distributed in a predetermined arrangement over the carrier body, and a plurality of openings in the carrier body for passing medical instruments therethrough.

13 Claims, 4 Drawing Sheets

MULTICHANNEL RADIO FREQUENCY ARRAY FOR TRACKING A MEDICAL INSTRUMENT

This application claims the benefit of German Patent Application No. DE 10 2022 205 796.1, filed on Jun. 8, 2022, which is hereby incorporated by reference in its entirety.

BACKGROUND

The present embodiments relate to a local coil for percutaneous MRT-assisted minimally invasive intervention.

Magnetic resonance tomography units are imaging apparatuses that, so as to map an examination object, align nuclear spins of the examination object with a strong external magnetic field and excite the nuclear spins via an alternating magnetic field so as to facilitate precession around this alignment. The precession or return of the spins from this excited state to a lower energy state generates, in response, an alternating magnetic field that is received via antennas.

With the aid of magnetic gradient fields, a spatial coding is impressed on the signals, which subsequently enables the received signal to be assigned to a volume element. The received signal is then evaluated, and a three-dimensional imaging representation of the examination object is provided. In order to receive signals, local receiving antennas (e.g., local coils) are used. The local coils are arranged directly on the examination object so as to achieve an improved signal-noise ratio.

A magnetic resonance tomography unit allows visualization of the inside of the body over a longer period of time without exposing the patient or operator to an increased dose of ionizing radiation. Owing to the low signal strengths and consequently the long integration times that are to be provided, magnetic resonance tomography may only be used with difficulty for real-time monitoring. Conventional local coils, which improve signal reception, are detrimental because of the required proximity to the area to be imaged and their space requirements during intervention.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a local coil that facilitates monitoring of an intervention is provided.

The local coil in accordance with the present embodiments is provided for percutaneous minimally invasive intervention while monitoring using a magnetic resonance tomography unit. The local coil is configured so as to detect magnetic resonance signals from a body of a patient for imaging.

The local coil has a carrier body for flat arrangement on a body surface of the patient. The carrier body may be rigid and reshaped according to the surface or may be formed in a flexible manner.

A plurality of electrical antennas is distributed in a predetermined arrangement over the carrier body. The arrangement may be performed, for example, in a regular two-dimensional matrix.

The carrier body has a plurality of openings in the carrier body for passing medical instruments therethrough. In one embodiment, the openings are each arranged between antennas.

In one embodiment, the plurality of openings enables flexible access to the patient.

In one embodiment of the local coil, the electrical antenna has a conductor surface on the carrier body. In one embodiment, the conductor surface extends along an axis. In other words, the extent along this axis is at least multiple times greater than perpendicularly (e.g., two times, five times, or ten times). On the carrier body may provide, in this case, that the conductor surface is applied directly on the carrier body (e.g., as a foil or coating) but also that the conductor surface is configured on a structure or is self-supporting and is attached to the carrier body. A rigid or flexible printed circuit board may also be provided as a structure that is attached in or on the carrier body.

In one embodiment, a conductor surface on the carrier body allows a space-saving and flexible solution in the design of the shape of the conductor surface.

In one embodiment of the local coil, the conductor surface is arranged on or in a printed circuit board. The printed circuit board may be, in this case, for example, a printed circuit board having one, two, or multiple layers of conductor material.

A printed circuit board is a tried and tested and cost-effective solution for producing conductor structures.

In one embodiment of the local coil, the electrical antenna has a capacitor and/or an inductance. These electrical components may be configured so that the electrical antenna is resonant at a predetermined frequency that corresponds to a Larmor frequency of a magnetic resonance signal that is to be detected using the local coil in a magnetic resonance tomography unit. However, these electrical components may be provided, for example, in conjunction with a switching element for detuning the electrical antenna during an excitation pulse.

In one embodiment, the capacitance and/or inductance allows the electrical antenna to be resonant and thus sensitive to the magnetic resonance signal even with dimensions substantially smaller than the wavelength of a magnetic resonance signal.

In one embodiment of the local coil, the printed circuit board has a ground surface on one side of an insulating layer of the printed circuit board. Further, the printed circuit board has a conductor strip that is galvanically isolated by the insulating layer of the printed circuit board and is arranged on one side or surface of the insulating layer that lies opposite the ground surface. The surfaces that are defined by the essentially two-dimensional extent of the printed circuit board are to be regarded as a side or surface, in contrast to the edges of the printed circuit board that are limited in a dimension to the thickness of the printed circuit board. The dimensions of the ground surface are, in this case, greater than the dimensions of the conductor strip (e.g., in a transverse manner with respect to the axis of the lengthwise extent of the conductor strip). In one embodiment, the ground surface is configured jointly as a continuous surface for multiple electrical antennas or also takes up a complete side of the insulating layer.

In one embodiment, the ground surface of the electrical antenna determines a preferred direction for receiving signals, when viewed from the ground surface in the direction of the conductor strip, so that, for example, only signals from the body of a patient are received, but not signals from a person who is guiding an instrument from outside the body.

In one embodiment of the local coil, the electrical antennas are configured as folded dipoles.

In one embodiment, a folded dipole is less sensitive to static discharges that are triggered, for example, by movements of an operator.

In one embodiment of the local coil, the electrical antennas are configured as stretched dipoles.

In one embodiment, stretched antennas without a closed conductor loop are less sensitive to eddy currents, such as may be generated by gradients of a magnetic resonance tomography unit.

In one embodiment of the local coil, the antennas are arranged along a plurality of parallel lines on the printed circuit board. The lines may be straight or part of a straight line. The straight lines may be arranged with a predetermined spacing with respect to one another. An antenna is to be regarded as arranged along a line if the axis of its largest dimension is parallel to the line in the case of a straight line. In the case of a curved line, the antenna is arranged along the line if the antenna has at least one point in common with the line and the axis of its largest dimension forms an angle that is less than 20 degrees or 10 degrees with a tangent at the point.

In one embodiment of the local coil, the antennas are arranged along the lines separated from one another by gaps. The gaps have a predetermined length that may be equal for all gaps. In other words, the electrical antennas are arranged uniformly distributed along the line.

The antennas on adjacent lines are arranged offset with respect to one another. In the direction perpendicular to the lines, for directly adjacent lines, in each case, an antenna is opposite a gap. In terms of the present embodiments, an antenna is opposite a gap if middle points or centers of gravity of the gap and electrical antenna lie on a common perpendicular to a line.

The predetermined spacing of the lines and consequently the electrical antenna render it possible to achieve a more homogenous receiving sensitivity in the examination volume. Further, the spacing along the lines and the offset arrangement of antennas of adjacent antennas enable adjacent antenna to be decoupled more efficiently.

In one embodiment of the local coil, the projections of the antennas of an adjacent line have an overlap with a predetermined length in a perpendicular manner with respect to the lines. In other words, the gap between two antennas of one line is smaller than the length or the dimension of an electrical antenna of the directly adjacent line. However, between the neighbors on the adjacent lines, a predetermined spacing or gap may be set along the line. The size of the gap or of the overlap is, in this case, dependent upon the spacings of the electrical antennas along the lines and between the lines (e.g., in relation to the dimensions of the electrical antennas).

In an embodiment, it is possible with the overlap or gap to reduce a decoupling between the electrical antennas of directly adjacent lines without having to further increase the size of the spacing.

The above described characteristics, features, and advantages of this invention and the manner in which these are achieved are more clearly and more precisely understandable in conjunction with the following description of the exemplary embodiments that are explained in more detail in connection with the drawings.

DETAILED DESCRIPTION

Figure 1:
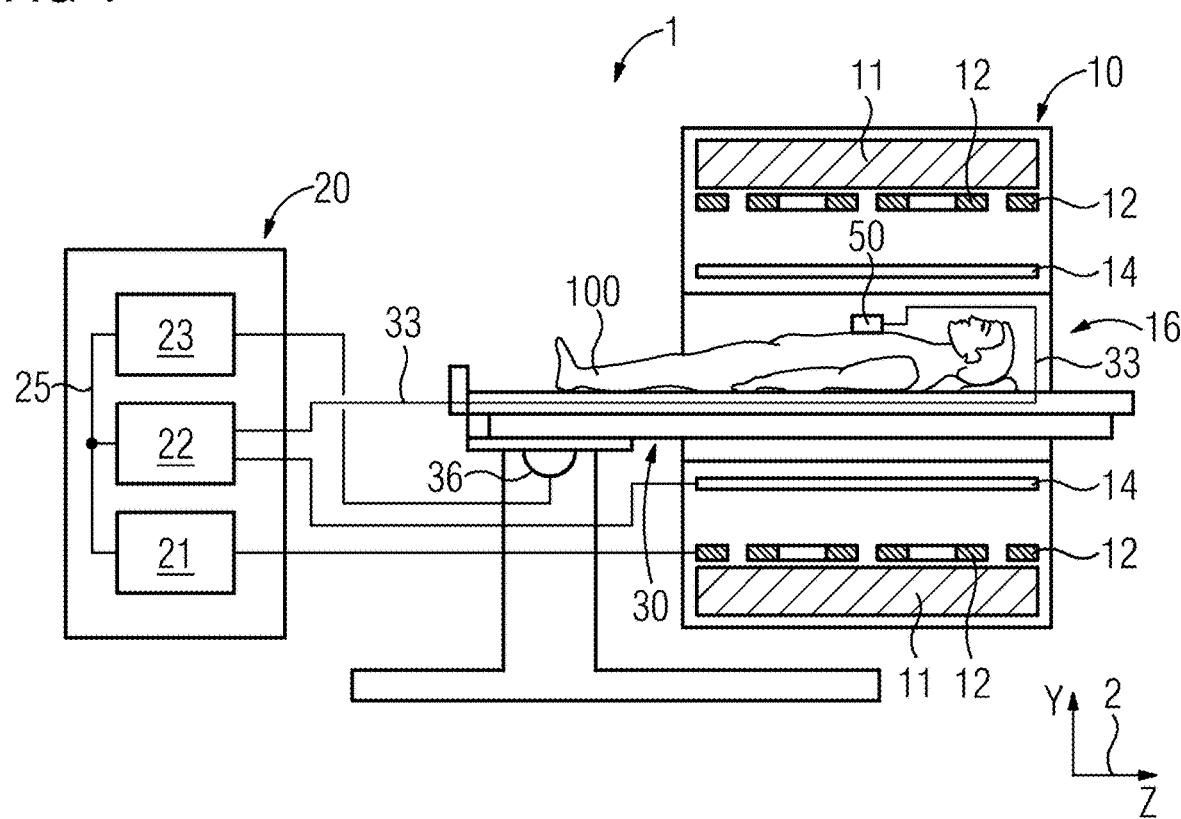
FIG. 1 shows a schematic representation of a magnetic resonance tomography unit having a local coil in accordance with an embodiment.

FIG. 1 shows a schematic representation of an embodiment of a magnetic resonance tomography unit 1 having a local coil 50 in accordance with the present embodiments.

The magnet unit 10 has a field magnet 11 that generates a static magnetic field BO so as to align nuclear spins of samples or of the patient 100 in an imaging area. The imaging area is characterized by an extremely homogeneous static magnetic field BO, where the homogeneity relates, for example, to the magnetic field strength or magnitude. The imaging area is almost spherical and is arranged in a patient tunnel 16 that extends in a lengthwise direction 2 through the magnet unit 10. A patient bed 30 may be moved in the patient tunnel 16 by the drive unit 36. The field magnet 11 may be a superconducting magnet that may provide magnetic fields with a magnetic flux density of up to 3 T or, in the case of latest models, even higher. However, it is also possible for lower magnetic field strengths to also use permanent magnets or electromagnets with normal conducting coils.

Further, the magnet unit 10 has gradient coils 12 that are configured so as to superimpose temporally and spatially variable magnetic fields in three spatial directions on the magnetic field BO for spatial differentiation of the detected mapping areas in the examination volume. The gradient coils 12 may be coils of normal conducting wires that may create mutually orthogonal fields in the examination volume.

The magnet unit 10 also has a body coil 14 that is configured to radiate a radio frequency signal that is supplied via a signal line, into the examination volume, and to receive resonance signals that are emitted by the patient 100 and to deliver the resonance signals via a signal line.

A control unit 20 supplies the magnet unit 10 with the different signals for the gradient coils 12 and the body coil 14 and evaluates the received signals.

Thus, the control unit 20 has a gradient controller 21 that is configured so as to supply the gradient coils 12 via supply lines with variable currents that provide in a temporally coordinated manner the desired gradient fields in the examination volume.

Further, the control unit 20 has a radio frequency unit 22 that is configured so as to generate a radio frequency pulse that has a predetermined chronological sequence, amplitude, and spectral power distribution so as to excite a magnetic resonance of the nuclear spin in the patient 100. In so doing, pulse powers in the range of kilowatts may be achieved. The excitation signals may be radiated via the body coil 14 or also via a local transmitting antenna into the patient 100.

A controller 23 communicates with the gradient controller 21 and the radio frequency unit 22 via a signal bus 25.

So as to receive the magnet resonance signal, a local coil 50 in accordance with the present embodiments is arranged on the patient 100 in the patient tunnel 16 in order to detect magnet resonance signals from an examination region in close proximity with the highest possible signal-to-noise ratio. The local coil 50 is in signal connection with a receiver in the radio frequency unit 22 via a connection line 33.

Figure 2:
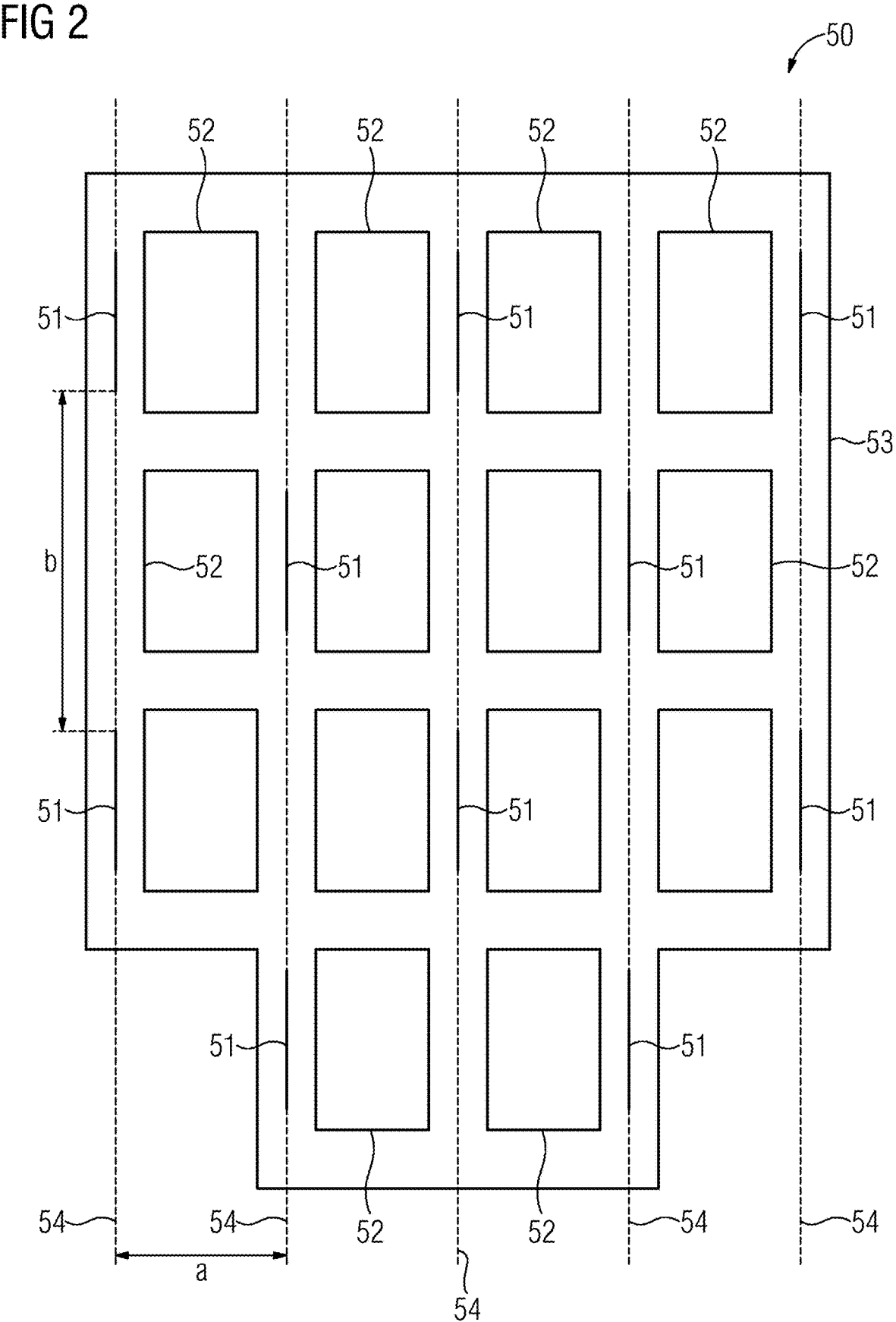
FIG. 2 shows a schematic representation of an embodiment of the local coil.

FIG. 2 shows a schematic representation of an embodiment of the local coil 50 in accordance with the present embodiments. In this case, only the fundamental structural elements are illustrated in FIG. 2 in order to provide an overview.

The local coil 50 has a number of electrical antennas 51 that are explained in more detail with reference to the following figures. The electrical antennas 51 are in this case arranged along a multiplicity of mutually parallel lines 54. In one embodiment, the electrical antennas 51 have identical dimensions in this case. The lines 54 may be straight lines, but the lines 54 may also be skewed or curved, for example, in the case of a flexible local coil 50. The spacings a between the lines 45 may be constant. In one embodiment, the spacings change, for example, at the edge of the local coil 50, since the outer lines only have in each case one neighbor.

The electrical antennas 51 are arranged along the lines 54 with in each case same spacings b. However, the dimensions or spacings for electrical antennas 51 that lie at the edge may differ with respect to inner-lying electrical antennas 51. In this case, electrical antenna 51 on adjacent lines 54 are offset with respect to one another along the lines 54. In this case, the center of gravity or middle point of an electrical antenna 51 is not located opposite an adjacent electrical antenna 51 on the adjacent line 54 in the direction perpendicular to the lines 54, but there is a gap between two electrical antennas 51 on the adjacent line 54. In this manner, electrical antennas 51 may be decoupled from one another.

The electrical antennas 51 are arranged in, at, or on a carrier body 53. The carrier body 53 may be, for example, a flexible printed circuit board. In one embodiment, the electrical antennas 51 and their connections are then configured as conductor tracks on the printed circuit board. A flexible plastic material may be provided as a carrier body 53 into which wires and electrical antennas 51 are embedded. In one embodiment, the flexible printed circuit board is embedded in a flexible sleeve in order to protect the patient 100. A plurality of openings 52 is provided in the carrier body 53 between the electrical antennas 51, and an instrument may be introduced into a patient 100 through the openings 52.

Figure 3:
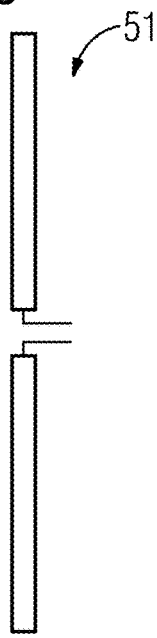
FIG. 3 shows a schematic representation of an electrical antenna of an embodiment of a local coil.
Figure 4:
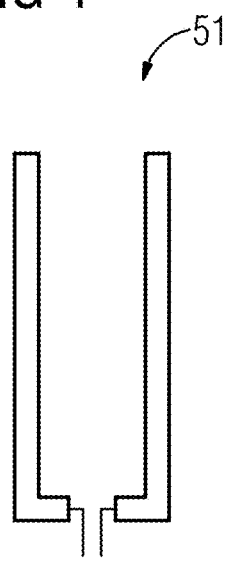
FIG. 4 shows a schematic representation of an electrical antenna of an embodiment of a local coil.
Figure 5:
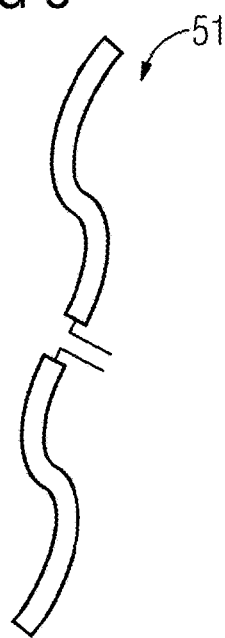
FIG. 5 shows a schematic representation of an electrical antenna of an embodiment of a local coil.

Different embodiments of an electrical antenna 51 of a local coil 50 in accordance with the present embodiments are illustrated schematically in FIGS. 3 to 6A and 6B. In FIG. 3, the electrical antenna 51 is a stretched or Hertzian dipole. In the case of the dimensions of a local coil and the Larmor frequencies used in the case of typically 0.5 T to 3 T, additional capacitances or inductances are provided in order to achieve a resonance. In FIG. 4, the dipole is folded. Again, despite the relatively doubled effective length, tuning by discrete capacitances and inductances is to be provided. In FIG. 5, the conductor tracks are not stretched but are curved, for example, in an s-shape. As a result of this, different field distributions may be achieved.

Figure 6A:
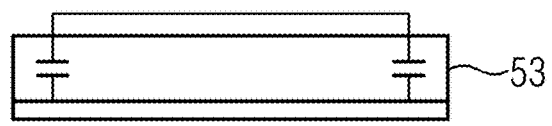
FIG. 6a shows a schematic representation of an electrical antenna of an embodiment of a local coil.
Figure 6B:
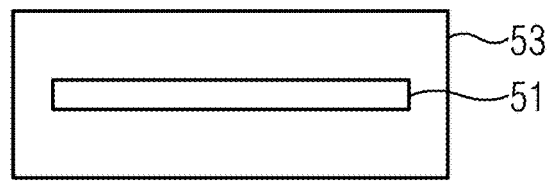
FIG. 6b shows a schematic representation of an electrical antenna of an embodiment of a local coil.

In FIGS. 6A and 6B, the electrical antenna 51 is configured as a strip conductor with respect to a ground surface. For example, FIGS. 6A and 6B may be implemented on, for example, a flexible printed circuit board as a carrier body 53. The strip conductor is arranged on one side, and a conductor surface is arranged as a ground surface on the other. Also, the embodiments of FIG. 3 to FIG. 5 may be implemented on a flexible printed circuit board, which enables a precise and cost-effective production.

Figure 7:
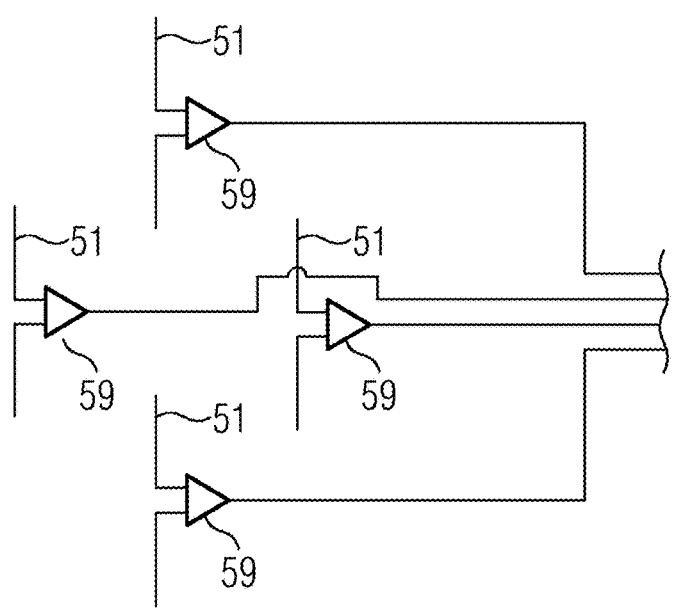
FIG. 7 schematically shows an example of an interconnection of the electrical antennas.

FIG. 7 illustrates an example of wiring of electrical antennas 51. The antenna signals are amplified in an electronic unit 59 by a low-noise preamplifier after the electrical antenna 51 has been adapted to the amplifier input. Filtering and/or frequency conversion in the electronic unit 59 may also be provided. In one embodiment, the signals of the electrical antenna 51 are already combined into modes before or after the amplification.

Figure 8:
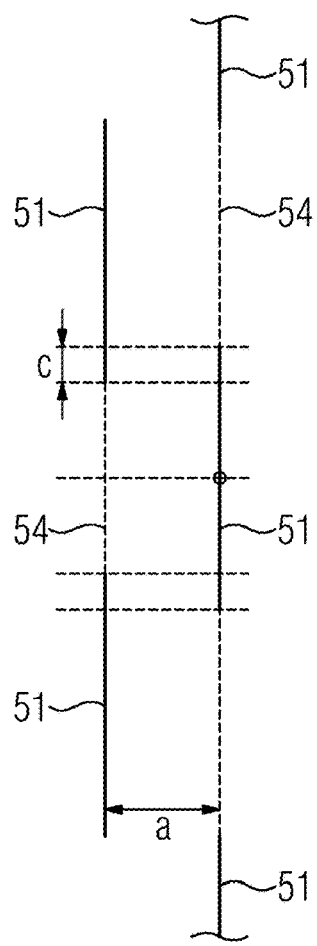
FIG. 8 shows a schematic representation of an overlap of adjacent electrical antennas.
Figure 9:
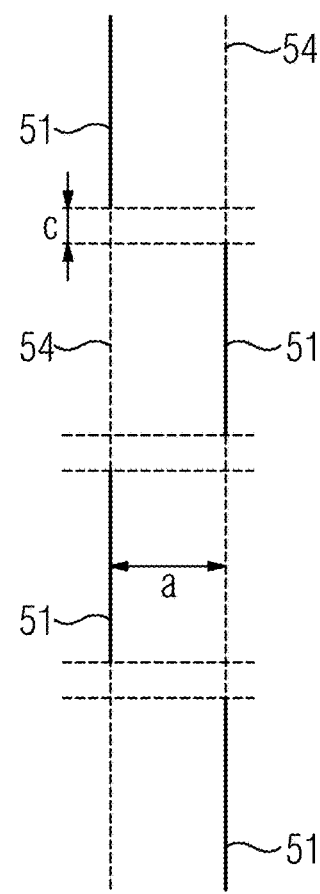
FIG. 9 shows a schematic representation of an offset of adjacent electrical antennas.

FIG. 8 illustrates an embodiment of the local coil 50 in which electrical antennas 51 of adjacent lines 54 are arranged along the lines 54 such that projections of the electrical antennas 51 have an overlap c in the direction of the normal to the lines 54. FIG. 9 illustrates an embodiment in which, in contrast, the projections have a gap c. The overlap may also be regarded in this case as a negative value of the length of the gap c or conversely. The gap c or the overlap render it possible in dependence upon the extent of the electrical antenna 51 and the spacings of the lines 54 to adjust the coupling of the electrical antennas 51 with respect to one another or a decoupling of the electrical antenna 51.

Although the invention has been illustrated and described in detail with the aid of the embodiments, the invention is not limited by the disclosed examples, and other variations may be derived therefrom by the person skilled in the art without departing from the protective scope of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A local coil for percutaneous magnetic resonance tomography (MRT)-assisted minimally invasive intervention, the local coil comprising:
   a carrier body for flat arrangement on a body surface of a patient;
   a plurality of electrical antennas distributed in a predetermined arrangement over the carrier body; and a plurality of openings in the carrier body for passing medical instruments through the carrier body, wherein the plurality of electrical antennas have a conductor surface on the carrier body, wherein the conductor surface is arranged on a printed circuit board, wherein the plurality of electrical antennas are arranged along a plurality of parallel lines on the printed circuit board, the plurality of parallel lines on the printed circuit board including a first parallel line and a second parallel line, the second parallel line being opposite and offset relative to the first parallel line, such that the first parallel line and the second parallel line are separated from one another by a first gap, wherein the plurality of electrical antennas are arranged along the plurality of parallel lines, the plurality of electrical antennas including a first electrical antenna and a second electrical antenna arranged along the first parallel line and separated by a second gap, the plurality of electrical antennas also including a third electrical antenna arranged along the second parallel line, and wherein in a direction perpendicular to the plurality of parallel lines, in adjacent parallel lines, one electrical antenna of the plurality of electrical antennas is opposite a gap in each case, such that the third electrical antenna arranged along the second parallel line is opposite the second gap of the first parallel line in the direction perpendicular to the plurality of parallel lines.

2. The local coil of claim 1, wherein an electrical antenna of the plurality of antennas comprises a capacitor, an inductance, or the capacitor and the inductance.

3. The local coil of claim 2, wherein the printed circuit board has a ground surface on one side of an insulating layer of the printed circuit board, and the plurality of electrical antennas are configured as conductor strips on another side of the insulating layer.

4. The local coil of claim 3, wherein the plurality of electrical antennas are configured as folded dipoles.

5. The local coil of claim 2, wherein the plurality of electrical antennas are configured as folded dipoles.

6. The local coil of claim 1, wherein the printed circuit board has a ground surface on one side of an insulating layer of the printed circuit board, and the plurality of electrical antennas are configured as conductor strips on another side of the insulating layer.

7. The local coil of claim 6, wherein the plurality of electrical antennas are configured as folded dipoles.

8. The local coil of claim 1, wherein the plurality of electrical antennas are configured as folded dipoles.

9. The local coil of claim 1, wherein the plurality of electrical antennas are configured as stretched dipoles.

10. The local coil of claim 1, wherein projections of the plurality of electrical antennas of an adjacent line of the adjacent lines have an overlap or spacing with a predetermined length in a perpendicular manner with respect to the plurality of parallel lines.

11. The local coil of claim 1, wherein the plurality of electrical antennas also includes a fourth electrical antenna arranged along the second parallel line, the fourth electrical antenna and the third electrical antenna arranged along the second parallel line being separated by a third gap, and wherein the first electrical antenna arranged along the first parallel line is opposite the third gap of the second parallel line in the direction perpendicular to the plurality of parallel lines.

12. The local coil of claim 1, wherein a length of the second gap is smaller than a length of the third electrical antenna.

13. The local coil of claim 1, wherein the third electrical antenna arranged along the second parallel line is opposite the second gap of the first parallel line in the direction perpendicular to the plurality of parallel lines, in that a middle point of the second gap and a middle point of the third electrical antenna arranged along the second parallel line lie on a common perpendicular to the first parallel line and the second parallel line.

* * * * *